(No Model.)
D. W. BIRMINGHAM.
PROCESS OF SEPARATING METALS FROM THEIR ORES.
No. 370,366. Patented Sept. 20, 1887.
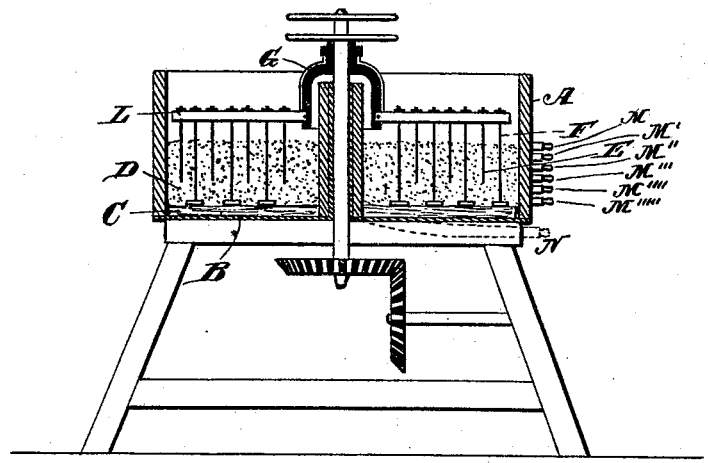
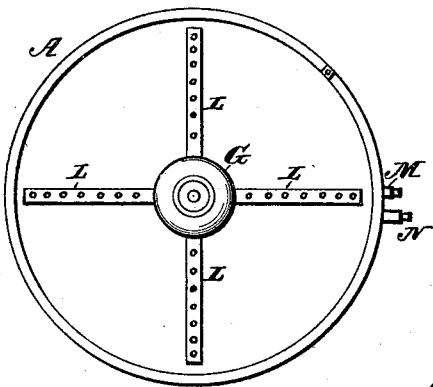
Witnesses.
Robert Everett.
Percy B. Hills.
Inventor:
David W. Birmingham
By James L. Norris.
Atty.

UNITED STATES PATENT OFFICE.

DAVID WALTON BIRMINGHAM, OF CLIFTON, NEW YORK.

PROCESS OF SEPARATING METALS FROM THEIR ORES.

SPECIFICATION forming part of Letters Patent No. 370,366, dated September 20, 1887.

Original application filed December 20, 1883, Serial No. 115,205. Divided and this application filed May 4, 1886. Serial No. 201,076.

(No model.)

*To all whom it may concern:*

Be it known that I, DAVID WALTON BIRMINGHAM, a citizen of the United States, residing at Clifton, in the county of Richmond and State of New York, have invented new and useful Improvements in Processes of Separating Metals from their Ores, of which the following is a specification.

It is well known that many drawbacks are to be met with in the effort to successfully work ores of the nobler metals by amalgamation with mercury, and for this reason the mode has been more or less imperfectly performed. I have endeavored to obviate these difficulties and secure a higher percentage of the assay value of the ores by treating them in the following manner: The ores, if rebellious—that is, if combined with hostile bases—are first prepared by freeing them as much as possible of their refractory embodiments, and the precious mineral converted either into a free metallic or soluble form or into some suitable condition which will render their subsequent treatment a more thorough and less difficult proceeding. This may be accomplished by any mode adapted to the particular end desired—as, for instance, the removal of sulphur and volatile matters by the process of roasting. The process of amalgamation is made more or less complete as the mercury is finely diffused throughout the pulp and the minute metallic mineral brought into intimate contact with it. The mercury so diffused is more or less in minute particles, known as "floured mercury," which experience has shown to be difficult to aggregate or collect into mass and settle into its original fluid consistency. To surmount this obstacle and to amalgamate the fine particles of valuable metals in the pulp, I apply the electrical current, as hereinafter more particularly described, and which I also make serviceable in electrical deposition and preparation of metals in solution, aiding the deposition with such well-known chemical ingredients, substances, or materials as may best serve my purpose. I sometimes charge the mercury with chloride of sodium or other useful equivalent, as a decomposer of bases and the better to maintain thereby the amalgamating or electric energy. In the process of amalgamation, as in the practice in modern mining operations, the flouring of the mercury and the difficulty attending its aggregation or reunition are known facts, and as a consequent result in the failure to effectually settle and collect it a double loss is experienced in the carrying away not only of a large percentage of quicksilver, but of fine gold or silver or floured amalgams of the same. It is at this point where the electricity is made available, and where in part the feature of my invention presents itself, for by passing the current through the slime or pulp containing the fine floating particles of gold and silver, which are then coated with mercury, their precipitation into mercury or amalgam or to the bottom of the pan or settler is effected. With this mode of collecting the floured mercury and saving the float gold no further apprehensions need be felt concerning the losses by means of floured mercury referred to, for it will be an object now in the usual amalgamating processes to thoroughly intermix and blend the mercury as far as possible with the pulp, after which it is thrown down by the application of electricity into its regular amalgam.

In the accompanying drawings, Figure 1 represents a vertical central section, and Fig. 2 a top view, of an apparatus employed by me in carrying out my invention.

Referring to the drawings, it will be observed that Fig. 1 shows a circular pan or settler constructed of suitable material, preferably wood or any non-conducting substance, the feature being preferably the presentation of a continuous insulating or non-electrical conducting-surface, A, as shown.

B is the bottom, being of metal, or having a metal plate serving as an electrical conductor, upon which rests more or less fluid mercury or mercuric amalgam, C, and pulp or "slime," D, or diffused throughout the mass with particles of mercury.

G represents a suitable driving mechanism or muller-ring, to which are attached several radial arms or conducting-plates, or such other useful contrivance as is suitable to my purpose, said arms or suitable conductors arranged to be raised or lowered, as desired. To each radial arm or equivalent device may be attached minor agitators, mullers, grinders, or pins of convenient or desirable shape, some of conducting and some of non-conducting material, the former, E, being preferably of shorter length than the latter.

Through the center of the pan or settler rises a shaft, preferably insulated, having proper devices or connections communicating the motive power to the muller-ring G and radial arms L. The effect of insulating is to send the whole electric current to and down through the radial apparatus into and through the pulp or slime and out at the bottom of the pan, being carried away by suitable conductors. The ordinary devices for pan or settler, suitably insulated for the purposes above mentioned, will answer.

I may make use of such ingredients as will assist in this electrical deposition and increase the electrical conductivity of the mercury by placing the necessary substances in the pan or grinder or in the settler, with the pulp, as occasion may require, with which it becomes mixed or blended. M M' M$^2$ M$^3$ M$^4$ M$^5$ are discharge-holes, and N outlet for the mercury or amalgam.

In applying electricity to the pulp a heavy current is best rather than sharp ones, and to apply such current a large surface should connect from the wires. This may be accomplished by placing plates provided with suitable conducting and distributing points in or on top of the pulp and connecting them with wires, thus affording a large metallic surface to receive the electric current from the wire and pass it into the slimes or pulp.

I am aware that many attempts have been made to use electricity for amalgamation by passing the current into tables, sluices, and other apparatus holding mercury, the pulp, slimes, and water being made to pass over the same in a constant flow of feed and discharge, thus in part the electric current going off with the flow of the discharged slimes and water, the sands causing an attrition and, passing over the mercury, carrying away more or less of values. One effect of an electrical current applied to a body of mercury is to expel from it base amalgams, and as mercury will during amalgamation absorb more or less base metal that may exist with the precious metals in the pulverized ore, it is this base that fouls the mercury and causes the amalgam to break up into small particles, called "sickened" mercury; and if a current of electricity is applied to a body of mercury holding a combination of amalgam, its effect is to throw to the surface of the mercury small floured globules of base amalgam, and the waste and water flowing over the main body carries away these small particles, and thus loses values. Furthermore, the electric current being applied to an apparatus holding mercury without proper insulation, whereby a portion of the force follows and passes off with the pulp, slimes, waste, and water, the small particles of base amalgams being forced to the surface of any bed of mercury by action of the electric current, all add to the natural gravity and force to carry away any values that may be combined with base amalgam, so that the various modes of electricity heretofore applied are imperfect and inoperative. I apply the electric current to any given quantity of pulp, held, preferably, in any insulated apparatus, until each separate charge is fully and completely amalgamated and settled. The current is applied to the pulp or slime and enters through the entire mass, finding its way out through the pan or settler, or passing out through the bottom of the apparatus which holds each separate charge that is under treatment.

Gold is often difficult to amalgamate, even when it appears to the naked eye in a free condition, but when examined by a microscope will show that it is covered with a film or glaze of oxide or other base, which prevents its absorption by mercury, and when in a minute state of fine subdivision, with such coating, will cause the fine particles of precious metal to float instead of being taken up by the mercury. Both fine gold and mercury attract oxide and sulphide coatings, and even globules of pure mercury will by gravity roll over each other, the oxygen coating preventing their combination. Fine free gold and amalgam, when held in water in a small bottle, will, when shaken, rise to the surface and remain on top for months, but give the bottle a jar or shock, and down goes the metal, and will remain under water until again agitated, when it will rise and so remain until any impulse or concussion is given to it, when it is again submerged.

In addition to the effect of decomposing floured mercury, I use the current of electricity to assist in removing this oxide, and through the electric impulse on each particle, as the electric agency is passing throughout the mass of pulp, to precipitate and amalgamate the small particles of precious metal.

The ores are preferably prepared as specified in my Reissued Letters Patent No. 10,400, dated November 6, 1883, and in my invention set forth in Letters Patent No. 296,116, dated April 1, 1884.

Chloride of sodium may be intermixed with the saturated ore and with any other necessary chemical reagents, and the mass charged into an insulated pan or other appropriate mechanical vessel, with the pulp diluted to a proper consistency. These being agitated by any suitable mechanical appliances, the mercury, salt, and any additional chemicals required for the character of the ore under treatment are introduced and the current of electricity applied and passed through the pulp, the mercury having been more or less diffused and subdivided by the mechanical mullers or grinding agitators, and thus the quicksilver is held and intermixed throughout the whole body of pulp. The electric current, acting through the mass, assists to free the mercury and metals from their oxides, sulphides, and other base, creates or liberates hydrogen, which is attracted to the metals, and also acts on the chloride of sodium, eliminating chlorine, which goes to the metals, both the hydrogen and chlorine reagents assisting to free the metals from films and coatings of their base attachments, the sodium going to the mercury, creating and forming sodium amalgam, thus destroying any base coverings on the metals and assisting in the precipitation and aggregation of the values with an amalgam. The action of the current through the mass tends to bring the oxygen from the metals to the positive pole and the hydrogen going with the metals to the negative pole, in this way causing a continuous manufacture through electric and chemical reactions of hydrogen, chlorine, and sodium amalgam. After amalgamation is complete the pulp is thinned as much as possible, as the size of the vessel will admit, and partially settled in the pan-amalgamator, (with the mullers raised,) when subsequently the pulp or slimes are discharged into a larger pan or settling apparatus, so that the pulp can be diluted down to any consistent thinness, when a strong current is again applied to the slimes to precipitate and settle any values of floating amalgam into mercury on the bottom of the settler. So it will be seen that I also apply the electric current to the pulp, and to eliminate hydrogen, which in part passes to the mercury, giving it more fluidity, which prevents flouring, also in part passes to the precious metals, assisting in freeing them from their base films of oxides, drawing the latter to the positive pole toward the surface of the pulp.

I also apply the electric current to the pulp intermixed with mercury and the elements referred to, to eliminate chlorine from the sodium, forming in part a solution of hydrochloric acid, which helps to free the precious metals, while the sodium goes to the small particles of mercury, forming sodium amalgam throughout the whole mass. These electric and chemical reactions will assist to free and separate the baser from the precious metals, (or to throw them all into an amalgam,) giving the quicksilver a more absorbing and cohesive effect in amalgamation.

It is well known that sodium amalgam is a valuable medium in preventing the mercury from flouring and giving it more active biting effect to absorb the metals; but metallic sodium is so expensive that but small quantities are used in the mercury, so that its beneficial effects are lost on coming in contact with the elements, while by my process of applying the electric current to the pulp with solutions of chloride of sodium, sodium amalgam is forming as fast as it is used—viz., by separation and decomposition—changing any small particles of mercury in the mass to sodium amalgam at a nominal cost, thereby shortening the time required for amalgamation, doing more perfect work in saving values, several and greater amounts of work with the same apparatus, and saving in cost of mechanical power, all of which is claimed as an improvement on the present modes of saving of the precious metals by reduction by amalgamation.

What I claim is—

1. The process of separating metals from ores, which consists in amalgamating the ore, adding suitable chemicals in the amalgamating apparatus, intimately mingling or grinding the ore with mercury, and subjecting the ore pulp or slimes to the action of a positive current of electricity, the positive electrode being in contact with the ore pulp or slimes, the mercury and amalgam being finally deposited or collected at the negative electrode, substantially as described.

2. The process of separating metals from ores and saving the floured mercury, the same consisting in intimately mingling or grinding the ore with mercury and subjecting the ore pulp or slimes containing the floured mercury to the action of a positive current of electricity, the positive electrode being in contact with the slimes or pulp, the mercury amalgam being finally deposited or collected at the negative electrode, substantially as described.

In testimony whereof I affix my signature in presence of two witnesses.

DAVID WALTON BIRMINGHAM.

Witnesses:
MARK BIRMINGHAM,
J. H. CARVER.